(No Model.)
O. A. DAHL.
THILL COUPLING.
No. 440,472. Patented Nov. 11, 1890.
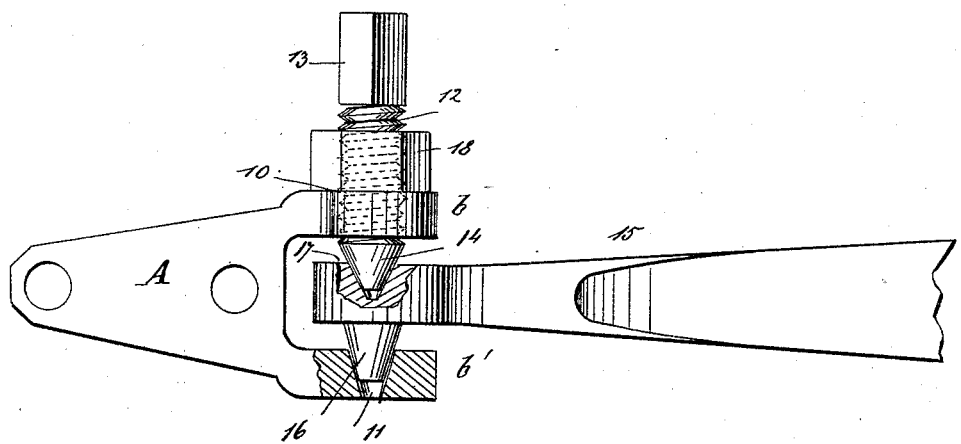
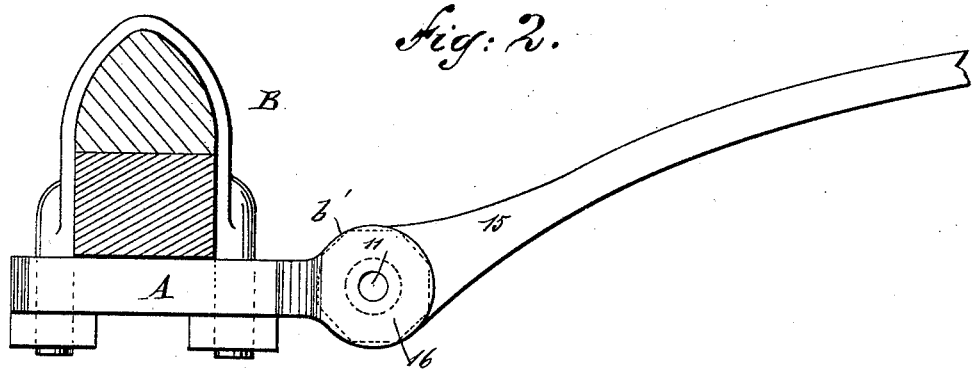
WITNESSES:
Chas. Niera
E. M. Clark
INVENTOR:
O. A. Dahl
BY Munn & Co
ATTORNEYS

UNITED STATES PATENT OFFICE.

OLAUS A. DAHL, OF MONA, IOWA.

THILL-COUPLING.

SPECIFICATION forming part of Letters Patent No. 440,472, dated November 11, 1890.

Application filed July 31, 1890. Serial No. 360,501. (No model.)

*To all whom it may concern:*

Be it known that I, OLAUS A. DAHL, of Mona, in the county of Mitchell and State of Iowa, have invented a new and Improved Thill-Coupling, of which the following is a full, clear, and exact description.

My invention relates to an improvement in thill-couplings, and has for its object to provide a coupling of simple, durable, and economic construction and capable of expeditious application; and a further object of the invention is to provide a thoroughly anti-rattling coupling and means for adjusting the members of the coupling to compensate for wear.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in both the views.

Figure 1 is a plan view of the coupling, and Fig. 2 is a side elevation of the coupling clipped upon the axle.

The lower member or plate A of the clip B is bifurcated at its forward end, and one member $b$ of the said bifurcated end is provided with a threaded aperture 10, while the opposite member $b'$ has a tapering aperture 11, the wall whereof is smooth.

In the threaded aperture of the member $b$ of the said lower clip-section a screw 12 is entered, which screw at its outer end is provided with a polygonal head 13, and the inner end of the screw is made tapering or conical, as illustrated at 14 in Fig. 1.

The inner extremity of the thill-iron 15 has formed upon one side a conical pin or bearing 16, adapted to enter and turn in the conical aperture 11 of the clip-plate A. In the opposite side of the thill-iron a conical recess 17 is produced, adapted to receive the inner conical extremity of the screw 12, and upon the screw 12 a lock-nut 18 is located, adapted to bear against the outer face of the member $b$ of the clip-plate.

In operation, when the thill-iron is to be connected with the clip-plate, the screw 12 is turned until the space between the members $b$ and $b'$ is practically unobstructed. The thill-iron is then passed into this space, and the pin 16 is seated in the conical opening or aperture 11. The screw 12 is then turned until its conical inner end seats itself in the correspondingly-shaped cavity of the thill-iron, and when properly seated an anti-rattling connection is effected, and the screw is prevented from turning in the wrong direction by the manipulation of the jam or lock nut 18. It will be observed that the thill-iron is thus pivoted upon conical bearings capable of being readily oiled, and should the said bearings become worn the parts may be readily tightened by causing the screw 12 to engage more tightly with the thill-iron.

Having thus described my invention, I claim as new and desire to secure by Letters Patent—

As an improved article of manufacture, a thill-coupling consisting in the clip-plate A, having two integral lugs $b$ $b'$, provided, respectively, with a screw-threaded aperture 10 and a conical socket 11 in line with each other, the thill-iron 15, having a conical bearing 16 on one side entering the socket 11, and a conical socket 17 in its opposite side, the screw 12, having a conical point 14 entering the socket 17, and a binding-nut 18, substantially as set forth.

OLAUS A. DAHL.

Witnesses:
H. G. KNUTSEN,
S. C. RUSTAD.